(12) United States Patent
Mochizuki (10) Patent No.: US 9,076,228 B2
(45) Date of Patent: Jul. 7, 2015

(54) IMAGE PROCESSING DEVICE, IMAGE PROCESSING METHOD, AND IMAGE PROCESSING SYSTEM

(75) Inventor: Atsushi Mochizuki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 386 days.

(21) Appl. No.: 13/598,171

(22) Filed: Aug. 29, 2012

(65) Prior Publication Data

US 2013/0249916 A1 Sep. 26, 2013

(30) Foreign Application Priority Data

Mar. 23, 2012 (JP) ................................ 2012-068004

(51) Int. Cl.
*G06T 17/00* (2006.01)
*G06T 3/40* (2006.01)

(52) U.S. Cl.
CPC ........................................ *G06T 3/40* (2013.01)

(58) Field of Classification Search
USPC ..................................... 345/419, 428; 348/43
See application file for complete search history.

(56) References Cited

U.S. PATENT DOCUMENTS

| | | | | |
|---|---|---|---|---|
| 5,631,977 A * | 5/1997 | Koshi et al. | .................... | 382/239 |
| 6,665,841 B1 * | 12/2003 | Mahoney et al. | ............. | 715/204 |
| 7,693,221 B2 * | 4/2010 | Routhier et al. | ......... | 375/240.26 |
| 8,068,117 B2 * | 11/2011 | Lefebvre et al. | ............... | 345/582 |
| 8,184,710 B2 * | 5/2012 | Srinivasan et al. | ........ | 375/240.18 |
| 8,605,082 B2 * | 12/2013 | Buchheit | ........................ | 345/419 |
| 2008/0152241 A1 * | 6/2008 | Itoi et al. | ........................ | 382/234 |
| 2010/0209016 A1 | 8/2010 | Kimata et al. | | |
| 2010/0260268 A1 * | 10/2010 | Cowan et al. | ............. | 375/240.25 |
| 2012/0026299 A1 * | 2/2012 | Arai | ................................ | 348/49 |
| 2012/0098930 A1 * | 4/2012 | Yamaguchi | ...................... | 348/43 |
| 2012/0113219 A1 * | 5/2012 | Chang et al. | ..................... | 348/43 |
| 2012/0113221 A1 * | 5/2012 | Yamada et al. | .................. | 348/43 |
| 2013/0069946 A1 * | 3/2013 | Venon et al. | ................... | 345/428 |

FOREIGN PATENT DOCUMENTS

| | | |
|---|---|---|
| JP | 2002-095011 | 3/2002 |
| JP | 2004-102689 | 4/2004 |
| JP | 2011-118908 | 6/2011 |

* cited by examiner

*Primary Examiner* — Kimbinh T Nguyen
(74) *Attorney, Agent, or Firm* — Knobbe, Martens, Olson & Bear, LLP (57) ABSTRACT

According to one embodiment, an image processing system includes an image processing device, an encoder, and a memory. The image processing device is configured to select one of a plurality of resolution candidates as a unified resolution, and to scale, according to the unified resolution, a first input image and a second input image to generate a first output image and a second output image, respectively. The first input image has a first resolution, the second input image has a second resolution different from the first resolution, and a resolution of the first output image is identical to a resolution of the second output image. The encoder is configured to encode the first output image and the second output image to generated encoded data. The memory is configured to store the encoded data.

20 Claims, 7 Drawing Sheets

| RESOLUTION CANDIDATE | NUMBER OF SELECTED TIMES |
|---|---|
| 320 x 240 | t1 |
| 480 x 360 | t2 |
| 640 x 480 | t3 |
| 960 x 720 | t4 |
| 1280 x 960 | t5 |

IMAGE PROCESSING DEVICE, IMAGE PROCESSING METHOD, AND IMAGE PROCESSING SYSTEM

CROSS REFERENCE TO RELATED APPLICATIONS

This application is based upon and claims the benefit of priority from the prior Japanese Patent Application No. 2012-68004, filed on Mar. 23, 2012, the entire contents of which are incorporated herein by reference.

FIELD

Embodiments described herein relate generally to an image processing device, an image processing method, and an image processing system.

BACKGROUND

In recent years, a stereoscopic display device which stereoscopically displays a video image is becoming widely used. A plurality of images seen from a plurality of viewpoints, for example, an image for the left eye and an image for the right eye, are displayed on the stereoscopic display device. A viewer sees the image for the right eye through the right eye and sees the image for the left eye through the left eye, so that the viewer sees a displayed video image stereoscopically.

By the way, the resolution of the image for the right eye and the resolution of the image for the left eye are not necessarily the same. For example, if one image is captured by a main camera and the other image is captured by a sub-camera, images having different resolutions may be acquired. However, when encoding the acquired images, the resolutions of all images must be the same depending on the encoding standard. Therefore, at least one of the images for the right eye and the left eye needs to be scaled.

When the image having a high resolution is reduced according to the image having a low resolution, there is a problem that a feeling of fineness is lost. On the other hand, when the image having a low resolution is enlarged according to the image having a high resolution, there is a problem that the difference between the image qualities of the two images becomes conspicuous.

DETAILED DESCRIPTION

In general, according to one embodiment, an image processing system includes an image processing device, an encoder, and a memory. The image processing device is configured to select one of a plurality of resolution candidates as a unified resolution, and to scale, according to the unified resolution, a first input image and a second input image to generate a first output image and a second output image, respectively. The first input image has a first resolution, the second input image has a second resolution different from the first resolution, and a resolution of the first output image is identical to a resolution of the second output image. The encoder is configured to encode the first output image and the second output image to generated encoded data. The memory is configured to store the encoded data. The image processing device includes a corresponding area detector, a resolution converter, a cost calculator, and a resolution determiner. The corresponding area detector is configured to detect a corresponding area in the second input image which corresponds to a block in the first input image. The resolution converter is configured to generate a first converted image by scaling the block according to a third resolution which is one of the resolution candidates, generate a second converted image by scaling the corresponding area according to the third resolution, generate a re-converted image by scaling the first converted image, according to a ratio between the first resolution and the third resolution, and scale, according to the unified resolution, the first input image and the second input image The cost calculator is configured to calculate a cost on scaling, according to the third resolution, the first input image and the second input image based on a first indication and a second indication, the first indication indicting a difference between the first converted image and the second converted image, the second indication indicating a difference between the re-converted image and the block. The resolution determiner is configured to determine one of the resolution candidates as the unified resolution based on the cost.

Embodiments will now be explained with reference to the accompanying drawings.

Figure 1:
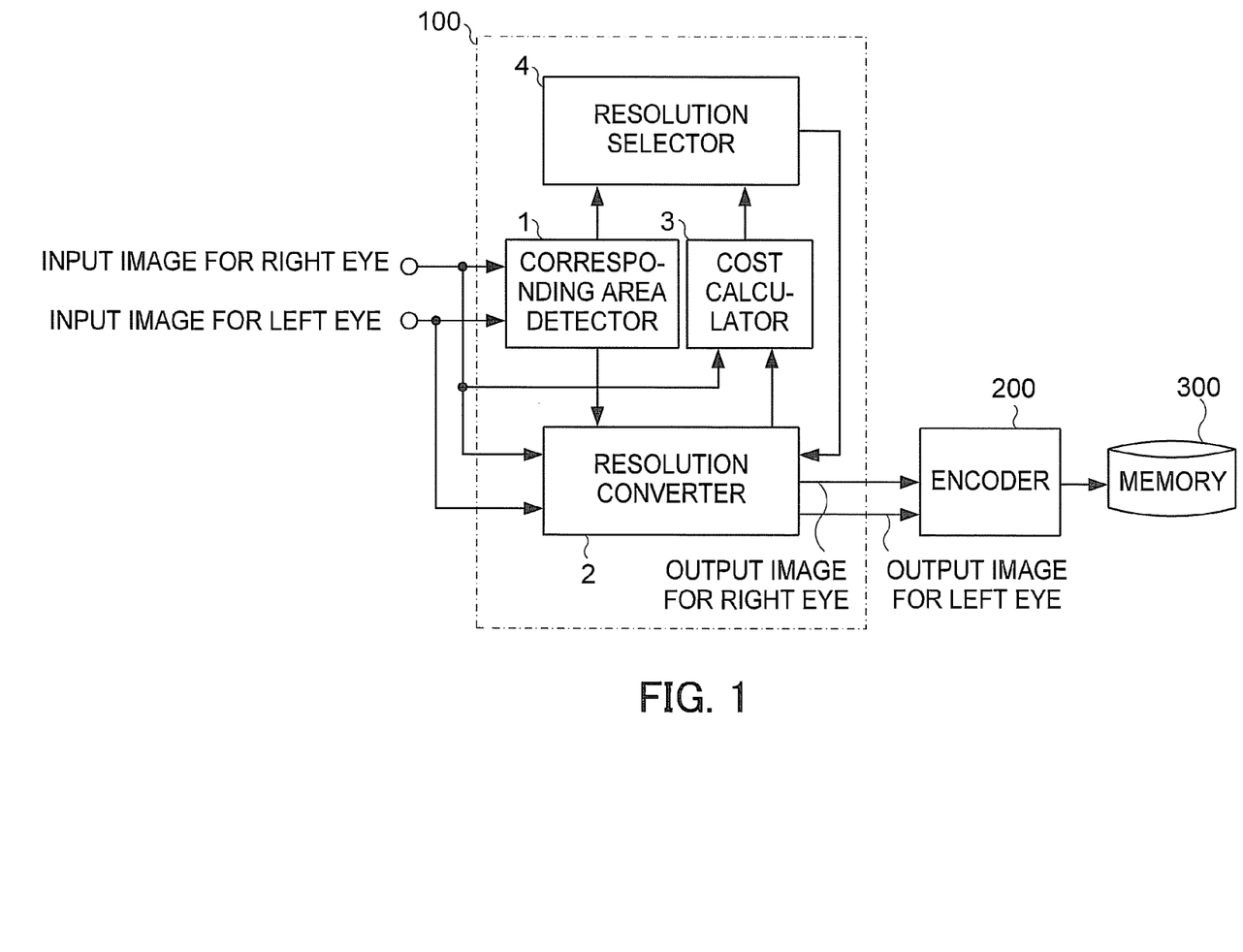
FIG. 1 is a schematic block diagram of an image processing system according to an embodiment.
Figure 2:
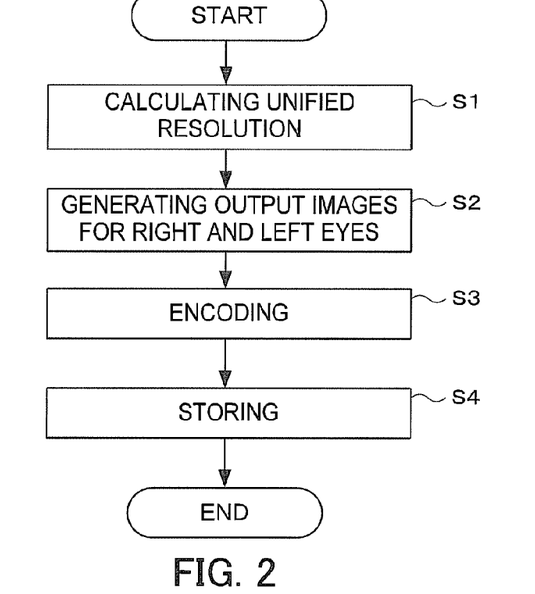
FIG. 2 is a flowchart showing an outline of a processing operation of the image processing system.

FIG. 1 is a schematic block diagram of an image processing system according to an embodiment. FIG. 2 is a flowchart showing an outline of a processing operation of the image processing system. The image processing system includes an image processing device 100, an encoder 200, and a memory 300.

A first input image and a second input image, resolutions of which are different from each other, are input into the image processing device 100. Hereinafter, the first input image is referred to as an input image for the right eye and the second input image is referred to as an input image for the left eye. As shown in FIG. 2, the image processing device 100 performs processing in two steps and unifies the resolutions of the input image for the right eye and the input image for the left eye. Specifically, in the first step, the image processing device 100 performs processing on one or a plurality of frames and calculates an optimal resolution from a plurality of resolution candidates (S1). Hereinafter, the obtained optimal resolution is referred to as a unified resolution. Next, in the second step, the image processing device 100 scales the input image for the right eye and the input image for the left eye according to the unified resolution and generates an output image for the right eye and an output image for the left eye which have the same resolution (S2).

The encoder 200 encodes the output image for the right eye and the output image for the left eye, the resolutions of which are unified, according to, for example, H.264 motion image compression standard, and generates encoded data (S3). The memory 300 stores the encoded data (S4).

Figure 3:
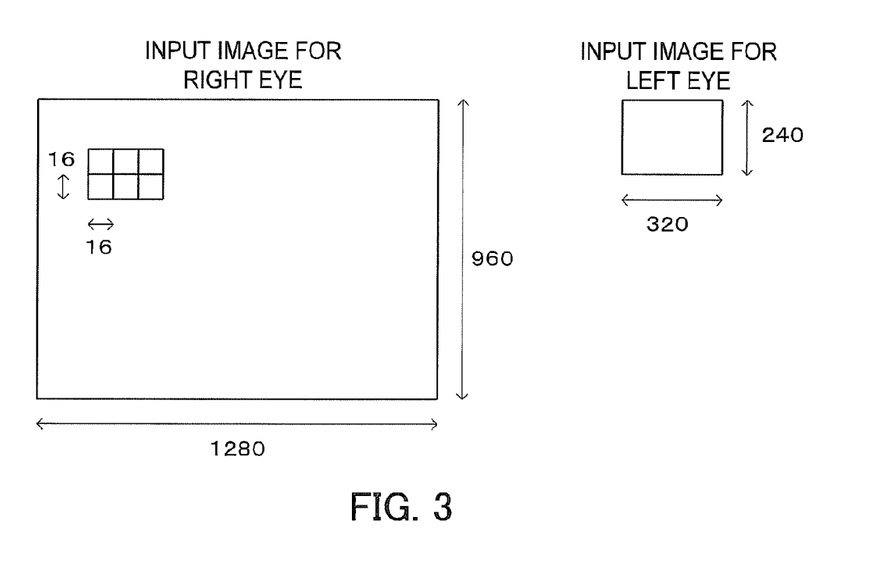
FIG. 3 is a diagram schematically showing an example of the input image for the right eye and the input image for the left eye described in the present embodiment.

FIG. 3 is a diagram schematically showing an example of the input image for the right eye and the input image for the left eye described in the present embodiment. The resolution of the input image for the right eye is assumed to be 1280×960 pixels. The resolution of the input image for the left eye is assumed to be 320×240 pixels, which is lower than the resolution of the input image for the right eye. In this case, both the horizontal and vertical resolutions of the input image for the left eye are 1/4 of those of the input image for the right eye. When an area of 16×16 pixels obtained by dividing the input image for the right eye is defined as one block, the input image for the right eye has a total of 4800 blocks in which there are 80 blocks in the horizontal direction and 60 blocks in the vertical direction.

Further, in the present embodiment, there are five resolution candidates: 1280×960, 960×720, 640×480, 480×360, and 320×240.

The above resolutions are only an example for describing the present embodiment, and the resolution of the input image is not limited. Much finer resolution candidates and much coarser resolution candidates may be defined. The resolution of the resolution candidate may be higher than the resolution of the input image for the right eye or may be lower than the resolution of the input image for the left eye. However, actually, a resolution between the resolutions of the two input images is usually optimal. Therefore, to reduce the processing load of the image processing device 100, it is desired that resolutions between the resolutions of the two input images are set to the resolution candidate.

Hereinafter, the image processing device 100 shown in FIG. 1 will be described in detail. The image processing device 100 includes a corresponding area detector 1, a resolution converter 2, a cost calculator 3, and a resolution selector 4.

The corresponding area detector 1 detects an area (hereinafter referred to as a corresponding area) in the input image for the left eye corresponding to each block in the input image for the right eye. The corresponding area detector 1 provides the presence/absence of the corresponding area to the resolution selector 4 and when the corresponding area is detected, the corresponding area detector 1 provides the corresponding area to the resolution converter 2.

Figure 4:
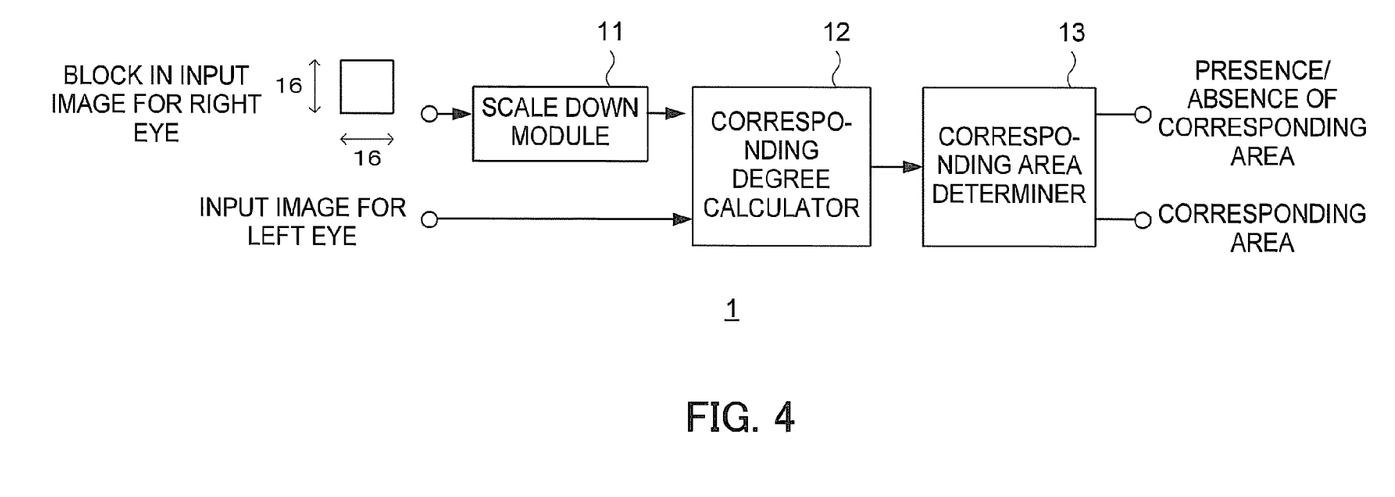
FIG. 4 is a block diagram showing an example of an internal configuration of the corresponding area detector 1.

FIG. 4 is a block diagram showing an example of an internal configuration of the corresponding area detector 1. The corresponding area detector 1 includes a scale down module 11, a corresponding degree calculator 12, and a corresponding area determiner 13.

The scale down module 11 scales a block of 16×16 pixels in the input image for the right eye according to a ratio of the resolution of the input image for the left eye and the resolution of the input image for the right eye. In the present example, the scale down module 11 reduces a block of 16×16 pixels in the input image for the right eye to 1/4 in both the horizontal direction and the vertical direction and generates a block of 4×4 pixels (a scaled image).

The corresponding degree calculator 12 calculates an indicator indicating a degree of similarity between a scaled-down block in the input image for the right eye and each area of 4×4 pixels in the input image for the left eye, which has the same size as the scaled-down block. The indicator is, for example, a sum of absolute differences between pixels corresponding to each other or a sum of coefficients obtained by transforming differences between pixels corresponding to each other by discrete cosine transform.

The corresponding area determiner 13 determines an area where the indicator is minimum, in other words, an area in the input image for the left eye most corresponding to a block in the input image for the right eye, as a corresponding area. However, if the indicator is greater than a predetermined threshold value, the corresponding area determiner 13 may determine that there is no corresponding area.

The manner described above is only an example for detecting the corresponding area. The corresponding area detector 1 may detect the corresponding area by using other manners such as a matching technique for calculating a motion vector.

The input image for the right eye and the input image for the left eye are images obtained by seeing an object from different viewpoints, and thus, an area corresponding to a block in the input image for the right eye is not necessarily present in the input image for the left eye. For example, there is a case in which the input image for the right eye includes a right side surface of an object, while the input image for the left eye does not include the right side surface of the object and includes only the left side surface. Therefore, the corresponding area detector 1 detects a corresponding area for each block in the input image for the right eye.

When the resolution converter 2 calculates a unified resolution, the resolution converter 2 scales the input image for the right eye and the input image for the left eye according to a single resolution (hereinafter referred to as a selected resolution) selected by the resolution selector 4 described later and provides the scaled images to the cost calculator 3. The resolution converter 2 scales the input image for the right eye and the input image for the left eye according to the unified resolution and generates an output image for the right eye and an output image for the left eye. In the present specification, the resolution conversion and the scaling mean both enlargement (scale-up) and reduction (scale-down), and the enlargement and reduction include the same size.

Figure 5:
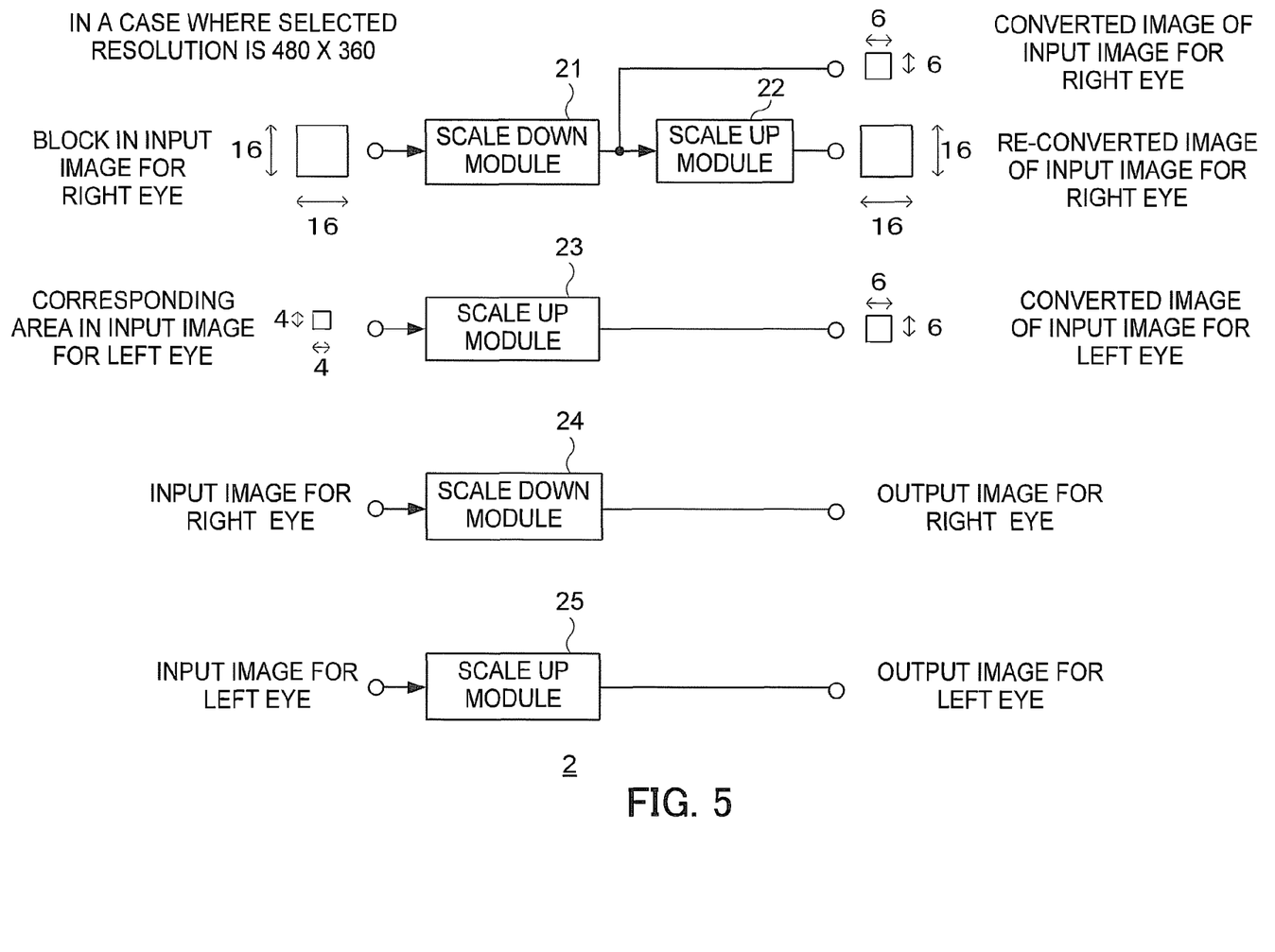
FIG. 5 is a block diagram showing an example of an internal configuration of the resolution converter 2.

FIG. 5 is a block diagram showing an example of an internal configuration of the resolution converter 2. FIG. 5 shows values of an example in which the selected resolution is 480×360. The resolution converter 2 includes a scale down module 21 and scale up modules 22 and 23 for calculating the unified resolution.

The scale down module 21 scales one of blocks in the input image for the right eye according to a ratio of the selected resolution and the resolution of the input image for the right eye and generates a converted image of the input image for the right eye. In the present example, the selected resolution is 3/8 of the resolution of the input image for the right eye in both the horizontal direction and the vertical direction. Therefore, the scale down module 21 scales-down an input image for the right eye including 16×16 pixels to 3/8 in both the horizontal direction and the vertical direction and generates a converted image of the input image for the right eye of 6×6 pixels.

The scale up module 22 scales the converted image of the input image for the right eye according to a ratio of the resolution of the input image for the right eye and the selected resolution and generates a re-converted image of the input image for the right eye. In the present example, the scale up module 22 scales-up the converted image of the input image for the right eye to 8/3 and generates a re-converted image of the input image for the right eye including 16×16 pixels. The resolution of the re-converted image is the same as the resolution of the input image for the right eye.

The scale up module 23 scales a corresponding area in the input image for the left eye according to a ratio of the selected resolution and the resolution of the input image for the left eye and generates a converted image of the input image for the left eye. In the present example, the selected resolution is 3/2 of the resolution of the input image for the left eye in both the horizontal direction and the vertical direction. Therefore, the scale up module 23 scales-up a corresponding area in the input image for the left eye including 4×4 pixels to 3/2 in both the horizontal direction and the vertical direction and generates a converted image of the input image for the left eye of 6×6 pixels.

The resolution converter 2 further includes a scale down module 24 and a scale up module 25 for generating an output image for the right eye and an output image for the left eye. The scale down module 24 scales the input image for the right eye according to a ratio of the unified resolution and the resolution of the input image for the right eye and generates an output image for the right eye. The scale up module 25 scales the input image for the left eye according to a ratio of the unified resolution and the resolution of the input image for the left eye and generates an output image for the left eye.

Although FIG. 5 shows an example in which the resolution converter 2 includes a plurality of scale down modules and a plurality of scale up modules, the resolution converter 2 may perform the scaling described above by using a single resolution conversion means. The reduction process of the scale down module 11 shown in FIG. 4 may be performed in the resolution converter 2. As a manner for converting resolution, a bilinear manner, a bi-cubic manner, and the like can be used, and not limited thereto.

The converted image of the input image for the right eye, the converted image of the input image for the left eye, the input image for the right eye, and the re-converted image of the input image for the right eye are input into the cost calculator 3. The cost calculator 3 calculates a cost for scaling the input image for the right eye and the input image for the left eye according to the selected resolution by considering both of the degradation of the feeling of fineness due to the scale-down of the input image for the right eye which has a high resolution and the difference of image quality between the image for the right eye and the image for the left eye caused by the scaling.

Figure 6:
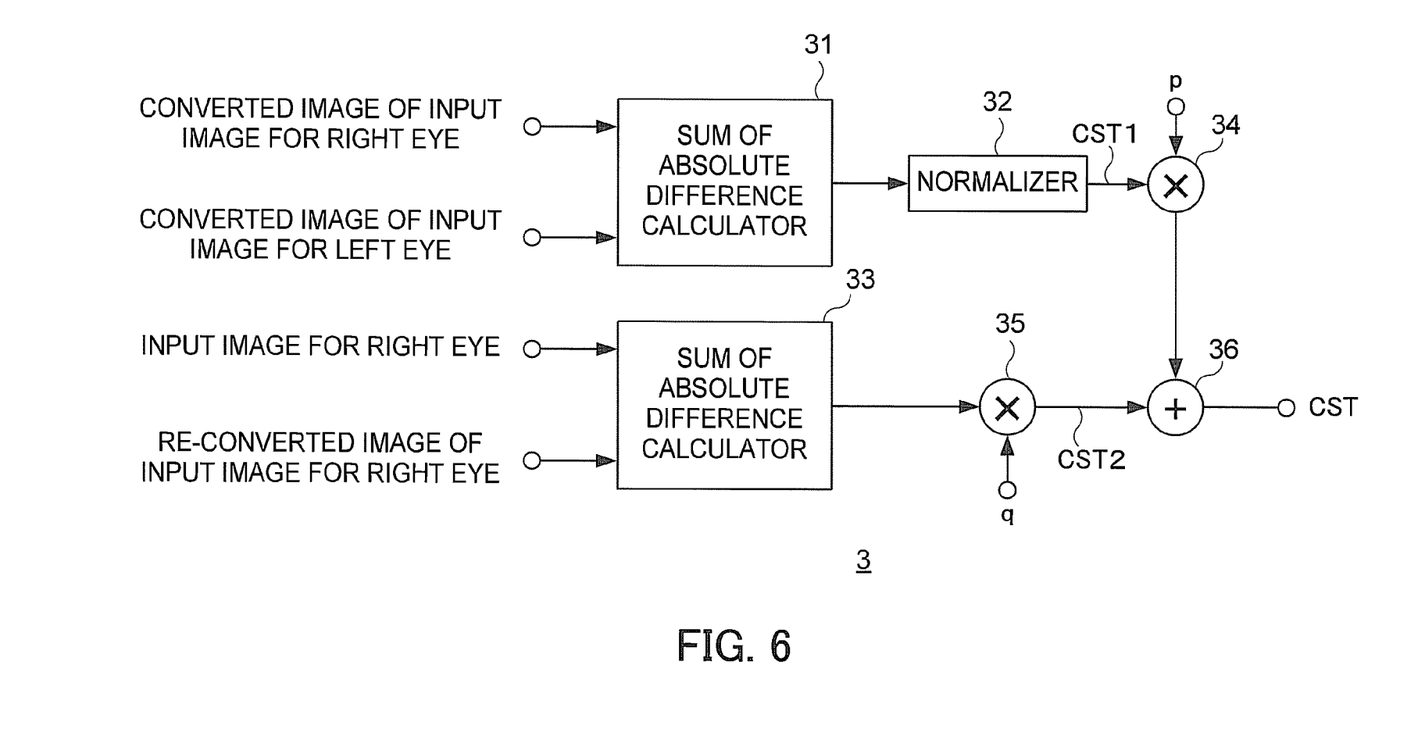
FIG. 6 is a block diagram showing an example of an internal configuration of the cost calculator 3.

FIG. 6 is a block diagram showing an example of an internal configuration of the cost calculator 3. The cost calculator 3 includes a sum of absolute difference calculator 31, a normalizer 32, a sum of absolute difference calculator 33, multipliers 34 and 35, and an adder 36.

The sum of absolute difference calculator 31 calculates a sum of absolute differences SAD between each pixel in the converted image of the input image for the right eye and each corresponding pixel in the converted image of the input image for the left eye. The sum of absolute differences SAD indicates a degree of similarity between the two converted images.

The value of the sum of absolute differences SAD is a sum of values, the number of which is the number of pixels in the converted image, so that the value of the sum of absolute differences SAD depends on the selected resolution. Therefore, the normalizer 32 normalizes the calculated sum of absolute differences SAD based on the formula (1) described below so that the sum of absolute differences SAD can be compared with sum of absolute differences SAD of another resolution, and calculates an image quality difference CST1.

$$CST1 = SAD * S\_base / S\_trans \quad (1)$$

Here, S_base is the number of pixels included in a block in the input image for the right eye. In the present example, S_base is 16×16=256. S_trans is the number of pixels in the converted image of the input image for the right eye and the converted image of the input image for the left eye. In an example in which the selected resolution is 480×360, S_trans is 6×6=36.

The image quality difference CST1 is a value obtained by quantifying the image quality difference between the image for the right eye and the image for the left eye caused by the scaling. As the image quality difference CST1 is smaller, the conversion to the selected resolution is more preferable.

The sum of absolute difference calculator 33 calculates a sum of absolute differences between each pixel in a block in the input image for the right eye and each corresponding pixel in the re-converted image of the input image for the right eye. The sum of absolute differences is an image quality difference CST2 between the two images. The image quality difference CST2 is a value obtained by quantifying the degradation of the feeling of fineness caused by reducing the input image for the right eye. As the image quality difference CST2 is smaller, the conversion to the selected resolution is more preferable. Note that the value of the image quality difference CST2 is a sum of values, the number of which is always the number of pixels in a block in the input image for the right eye (that is, 16×16) regardless of the selected resolution, and thus, the image quality difference CST2 need not be normalized.

Subsequently, the multipliers 34 and 35 and the adder 36 calculate a cost CST for converting to the resolutions to the selected resolution from the image quality differences CST1 and CST2 on the basis of the formula (2) described below.

$$CST = p*CST1 + q*CST2 \quad (2)$$

Here, p and q are predetermined constants. When giving greater importance to the image quality difference CST1, that is to say, when wanting to reduce the difference between the image for the right eye and the image for the left eye as much as possible, the constant p may be set to a large value. On the other hand, when giving greater importance to the image quality difference CST2, that is to say, when wanting to suppress the degradation of the feeling of fineness of the input image for the right eye as much as possible, the constant q may be set to a large value. As the cost CST is smaller, the conversion to the selected resolution is more preferable.

The cost CST may be calculated by using other indicators. For example, when calculating the image quality differences CST1 and CST2, it is possible to use a sum of coefficients obtained by discrete-cosine-transforming differences between pixels corresponding to each other, instead of the sum of absolute differences.

The cost calculator 3 calculates the cost CST for each resolution candidate for one block. In the present example, there are five resolution candidates, so that the cost calculator 3 calculates five costs CST for one block. The calculated cost CST is provided to the resolution selector 4. The cost calculator 3 calculates the cost CST for a predetermined number of blocks.

The resolution selector 4 controls an enlargement ratio and a reduction ratio of the resolution converter 2. More specifically, when calculating the unified resolution, the resolution selector 4 provides one of the resolution candidates to the resolution converter 2 by turns. The resolution selector 4 determines one of the resolution candidates as the unified resolution on the basis of the CST calculated by the cost calculator 3. On the other hand, when generating the output image for the right eye and the output image for the left eye, the resolution selector 4 provides the unified resolution to the resolution converter 2.

Figure 7:
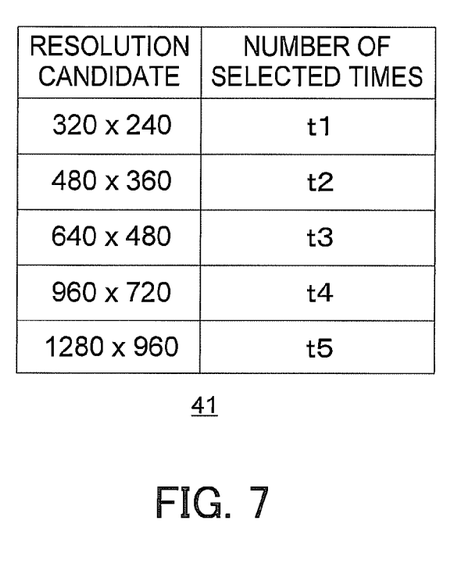
FIG. 7 is a diagram showing an example of a table 41 included in the resolution selector 4, and the table 41 is used to calculate the unified resolution.

FIG. 7 is a diagram showing an example of a table 41 included in the resolution selector 4, and the table 41 is used to calculate the unified resolution. In the table 41 shown in FIG. 7, the number of selected times t1 to t5 is recorded for each resolution candidate. When five costs CST corresponding to each resolution candidate are provided for one block, the number of selected times of one resolution candidate that minimizes the cost CST is incremented by one. For a block whose corresponding area has not been detected, the number of selected times of the maximum resolution candidate, that is, 1280×960 in the present example, is incremented by one. The number of selected times is updated for a predetermined number of blocks and the resolution selector 4 selects the resolution candidate whose number of selected times is maximum as the unified resolution.

Any number of blocks may be specified. For example, a few blocks near the center of one frame may be used to speed up the process, or 4800 blocks (=(1280*960)/(16*16) blocks) in one frame may be used. All blocks in several frames may be used to improve reliability of the unified resolution.

Figure 8:
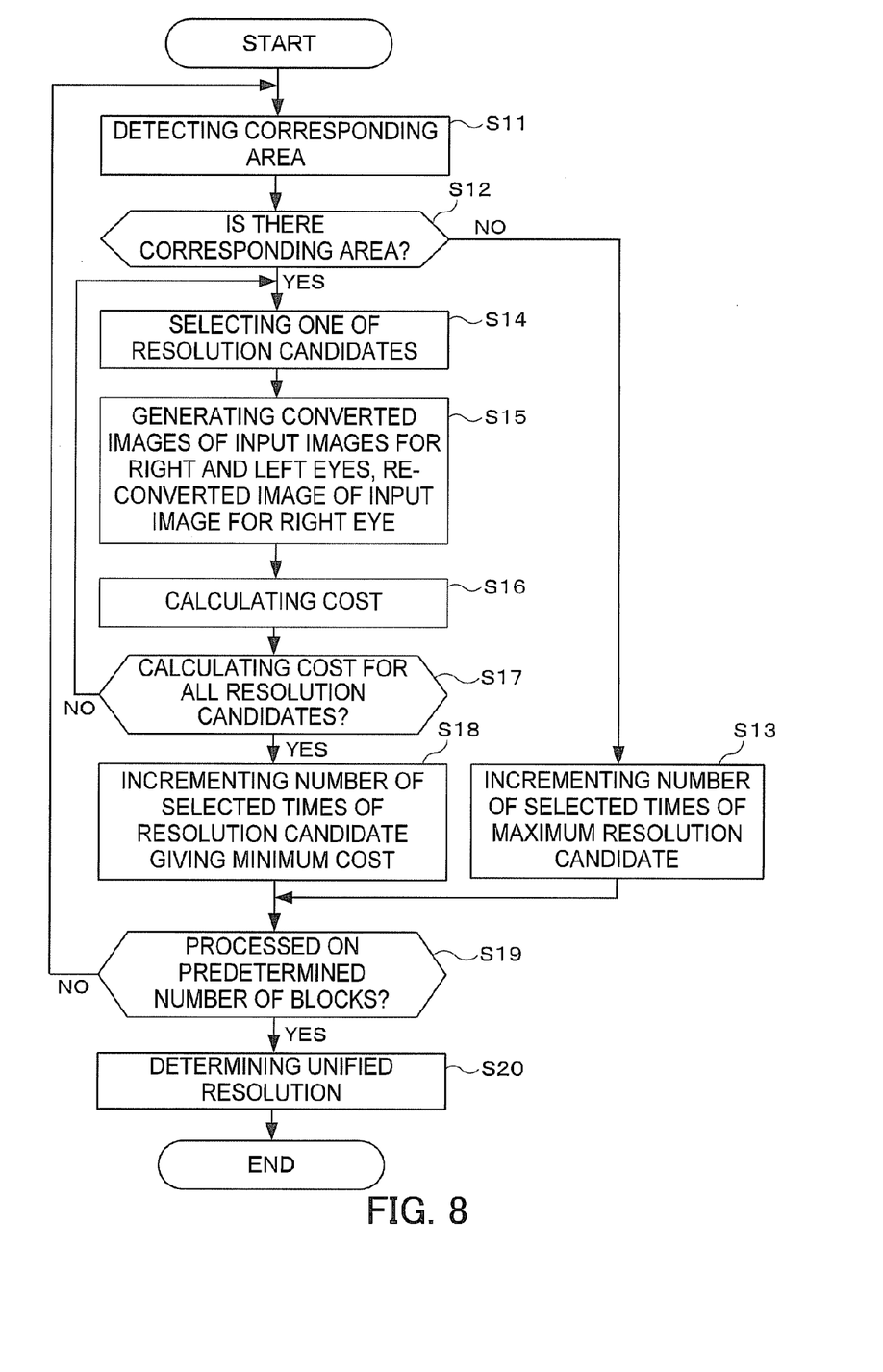
FIG. 8 is a flowchart showing an example of the processing operation of the image processing device 100.

FIG. 8 is a flowchart showing an example of the processing operation of the image processing device 100. FIG. 8 shows details of S1 in FIG. 2. Before performing the process in FIG. 8, the resolution selector 4 initializes the numbers of selected times t1 to t5 in the table 41 shown in FIG. 7 to be "0".

First, the corresponding area detector 1 detects an area in a second input image corresponding to a block in a first input image as a corresponding area (S11). Hereinafter, the first input image is referred to as the input image for right eye and the second input image is referred to as the input image for the left eye. In S11, the corresponding area detector 1 may detect a corresponding area from the input image for the left eye on the basis of a block in the input image for the right eye or from the input image for the right eye on the basis of a block in the input image for the left eye. If there is no corresponding area (NO in S12), the resolution selector 4 increments the number of selected times of the maximum resolution candidate, that is, the number of selected times t5 of FIG. 7 by one (S13).

If there is a corresponding area (YES in S12), the resolution selector 4 selects one of the resolution candidates as the selected resolution (S14). For example, the resolution selector 4 first selects 320×240 as the selected resolution. The resolution converter 2 scales a block in the input image for the right eye and a corresponding area in the input image for the left eye according to the selected resolution and generates the converted image of the input image for the right eye, the converted image of the input image for the left eye, and the re-converted image of the input image for the right eye (S15). On the basis of these images, the cost calculator 3 calculates the cost CST for converting the resolutions of the input image for the right eye and the input image for the left eye to the selected resolution (S16).

The cost calculator 3 calculates the cost CST for each of the resolution candidates (S17). In the present example, the process from S14 to S17 is repeated five times, which is the number of the resolution candidates. The resolution selector 4 increments the number of selected times of the resolution candidate giving minimum cost CST by one (S18). The process described above is performed for a predetermined number of blocks (S19). The resolution selector 4 determines the resolution candidate where the number of selected times is maximum as the unified resolution (S20).

The unified resolution is calculated by the process described above. When the unified resolution is calculated, the resolution selector 4 provides the unified resolution to the resolution converter 2. The scale down module 24 and the scale up module 25 in the resolution converter 2 scale the input image for the right eye and the output image for the left eye according to the unified resolution and generate the output image for the right eye and the output image for the left eye, respectively (S2 in FIG. 2).

In this way, in the present embodiment, the unified resolution is determined by considering both the difference of image quality between the image for the right eye and the image for the left eye caused by the scaling and the degradation of the feeling of fineness due to scale-down (reduction) of the image having a high resolution. Therefore, it is possible to scale the input image for the right eye and the input image for the left eye to an optimal unified resolution where the above difference and the above degradation are balanced.

Although, in the above embodiment, an example is described in which the resolution selector 4 updates the number of selected times of one resolution candidate by one at a time for each block in the input image for the right eye, the resolution selector 4 may select one of the resolution candidates by another method. For example, the process may be performed for each frame as described below.

The process from S11 to S19 in FIG. 8 is performed for blocks in one frame (however, in S19, whether or not blocks in one frame are processed is determined) and one resolution that is optimal for the frame is determined. The above process is performed for a predetermined number of frames and the resolution candidate, which is determined to be an optimal resolution the largest number of times, is determined as the unified resolution. For example, when the number of frames to be processed is 5, the resolution 640×480 is selected three times, and the resolution 960×720 is selected two times, the, the unified resolution is 640×480.

In the embodiment described above, to simplify the description, a case is described in which the number of pixels of the images generated by each module in the resolution converter 2 is an integer. However, depending on the input image for the right eye, the input image for the left eye, and the resolution candidate, the number of pixels of a scaled image may not be an integer. In this case, the resolution converter 2 may scale the image by increasing the number of pixels of the image to be scaled without changing the scaling ratio and generate an image including pixels, the number of which is a number where the digits after the decimal point of the number of pixels are rounded up. Hereinafter, a specific example of the process of the resolution converter 2 in FIG. 5 will be described by using an example in which the selected resolution is 1024×768.

In this case, the scaling ratio of the scale down module 21 is 4/5. If the scale down module 21 scales-down a block of 16×16 pixels in the input image for the right eye to 4/5, the block becomes 12.8×12.8 pixels. Therefore, the scale down module 21 scales-down a block of 17×17 pixels including the above block and adjacent pixels to 4/5 and generates an image of 13.6×13.6 pixels, and then determines effective 13×13 pixels among the 13.6×13.6 pixels as the converted image of the input image for the right eye.

The scale up module 22 scales-up the converted image of the input image for the right eye including 13×13 pixels to 5/4 and generates an image of 16.25×16.25 pixels, and then determines effective 16×16 pixels among the 16.25×16.25 pixels as the converted image of the input image for the right eye.

On the other hand, the scaling ratio of the scale up module 23 is 16/5. If the scale up module 23 scales-up a corresponding area in the input image for the left eye including 4×4 pixels to 16/5, the corresponding area becomes 12.8×12.8 pixels. Therefore, the scale up module 23 scales-up an area of 5×5 pixels including the above corresponding area and adjacent pixels to 16/5 and generates an image of 16×16 pixels, and then determines effective 13×13 pixels among the 16×16 pixels as the converted image of the input image for the left eye. In this case, the value of S_trans in the above formula (1) is 13×13=169.

Although, in the present embodiment, an example is described in which the input image for the right eye and the input image for the left eye, that is, images seen from left and right viewpoints, are input, images seen from upper and lower viewpoints or images seen from three or more viewpoints may be input. In this case, the above process is performed for each of the two images whose viewpoints are adjacent to each other and whose resolutions are different from each other, and a resolution which maximizes the number of selected times may be selected.

At least a part of the image processing system explained in the above embodiments can be formed of hardware or software. When the image processing system is partially formed of the software, it is possible to store a program implementing at least a partial function of the image processing system in a recording medium such as a flexible disc, CD-ROM, etc. and to execute the program by making a computer read the program. The recording medium is not limited to a removable medium such as a magnetic disk, optical disk, etc., and can be a fixed-type recording medium such as a hard disk device, memory, etc.

Further, a program realizing at least a partial function of the image processing system can be distributed through a communication line (including radio communication) such as the Internet etc. Furthermore, the program which is encrypted, modulated, or compressed can be distributed through a wired line or a radio link such as the Internet etc. or through the recording medium storing the program.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the inventions.

The invention claimed is:

1. An image processing system comprising:
an image processing device configured to select one of a plurality of resolution candidates as a unified resolution, and to scale, according to the unified resolution, a first input image and a second input image to generate a first output image and a second output image, respectively, the first input image comprising a first resolution, the second input image comprising a second resolution different from the first resolution, a resolution of the first output image being identical to a resolution of the second output image;
an encoder configured to encode the first output image and the second output image to generate encoded data; and
a memory configured to store the encoded data;
wherein the image processing device comprises:
a corresponding area detector configured to detect a corresponding area in the second input image which corresponds to a block in the first input image;
a resolution converter configured to
generate a first converted image by scaling the block according to a third resolution which is one of the resolution candidates,
generate a second converted image by scaling the corresponding area according to the third resolution,
generate a re-converted image by scaling the first converted image, according to a ratio between the first resolution and the third resolution, and
scale, according to the unified resolution, the first input image and the second input image;
a cost calculator configured to calculate a cost of scaling, according to the third resolution, the first input image and the second input image based on a first indication and a second indication, the first indication indicating a value obtained by quantifying an image quality difference based on differences between pixels corresponding to each other of the first converted image and the second converted image, the second indication indicating a value obtained by quantifying a degradation of a feeling of fineness based on differences between pixels corresponding to each other of the re-converted image and the block; and
a resolution determiner configured to determine one of the resolution candidates as the unified resolution based on the cost.

2. The system of claim 1, wherein the corresponding area detector is configured to detect the corresponding area based on a scaled image obtained by scaling, according to a ratio between the third resolution and the first resolution, the block.

3. The system of claim 2, wherein the corresponding area detector is configured to detect the corresponding area based on a sum of absolute difference or a sum of coefficients of discrete cosine transform of a difference between each pixel value in the scaled image and each pixel value in an area in the second input image, a pixel size of the area being identical to the scaled image.

4. The system of claim 3, wherein when the sum of absolute difference or the sum of coefficients of discrete cosine transform is larger than a first value, the corresponding area detector is configured to determine that the corresponding area is absent.

5. The system of claim 1, wherein the cost calculator is configured to calculate the first indication by normalizing a sum of absolute difference or a sum of coefficients of discrete cosine transform of a difference between each pixel value in the first converted image and each pixel value in the second converted image according to the third resolution.

6. The system of claim 1, wherein the cost calculator is configured to calculate the cost based on a following equation (1)

$$CST=p*CST1+q*CST2 \quad (1)$$

where, the CST is the cost, the CST1 is the first indication, the CST2 is the second indication, the "p" is a first constant and the "q" is a second constant.

7. The system of claim 1, wherein a plurality of costs are calculated for a first number of blocks or for blocks in a second number of frames,
the resolution selector is configured to select one of the resolution candidates as the unified resolution based on the calculated costs.

8. The system of claim 7, wherein the cost calculator is configured to calculate the costs for each of the resolution candidates for each of the first number of blocks, and
the resolution selector comprises count values each corresponding to each of the candidates,
is configured to count-up one of the count values corresponding to one of the resolution candidates which makes the cost minimum, and is configured to select one of the resolution candidates making the corresponding count value maximum as the unified resolution.

9. The system of claim 8, wherein the resolution selector is configured to count-up one of the count values corresponding to the maximum one of the resolution candidates when the corresponding area is absent.

10. An image processing device comprising:
a corresponding area detector configured to detect a corresponding area in a second input image which corresponds to a block in a first input image, the first input image comprising a first resolution, the second input image comprising a second resolution different from the first resolution;
a resolution converter configured to
generate a first converted image by scaling the block according to a third resolution which is one of a plurality of resolution candidates,
generate a second converted image by scaling the corresponding area according to the third resolution, and
generate a re-converted image by scaling the first converted image according to a ratio between the first resolution and the third resolution;
a cost calculator configured to calculate a cost of scaling, according to the third resolution, the first input image and the second input image based on a first indication and a second indication, the first indication indicating a value obtained by quantifying an image quality difference based on differences between pixels corresponding to each other of the first converted image and the second converted image, the second indication indicating a value obtained by quantifying a degradation of a feeling of fineness based on differences between pixels corresponding to each other of the re-converted image and the block; and
a resolution determiner configured to determine one of the resolution candidates as the unified resolution based on the cost.

11. The device of claim 10, wherein the corresponding area detector is configured to detect the corresponding area based on a scaled image obtained by scaling, according to a ratio between the third resolution and the first resolution, the block.

12. The device of claim 11, wherein the corresponding area detector is configured to detect the corresponding area based on a sum of absolute difference or a sum of coefficients of discrete cosine transform of a difference between each pixel value in the scaled image and each pixel value in an area in the second input image, a pixel size of the area being identical to the scaled image.

13. The device of claim 12, wherein when the sum of absolute difference or the sum of coefficients of discrete cosine transform is larger than a first value, the corresponding area detector is configured to determine that the corresponding area is absent.

14. The device of claim 10, wherein the resolution converter is configured to scale, according to the unified resolution, the first input image and the second input image to generate the first output image and the second output image, respectively, a resolution of the first output image being identical to a resolution of the second output image.

15. The device of claim 10, wherein the cost calculator is configured to calculate the first indication by normalizing a sum of absolute difference or a sum of coefficients of discrete cosine transform of a difference between each pixel value in the first converted image and each pixel value in the second converted image according to the third resolution.

16. The device of claim 10, wherein the cost calculator is configured to calculate the cost based on a following equation (2)

$$CST = p*CST1 + q*CST2 \quad (2)$$

where, the CST is the cost, the CST1 is the first indication, the CST2 is the second indication, the "p" is a first constant and the "q" is a second constant.

17. The device of claim 10, wherein a plurality of costs are calculated for a first number of blocks or for blocks in a second number of frames,
the resolution selector is configured to select one of the resolution candidates as the unified resolution based on the calculated costs.

18. The device of claim 17, wherein the cost calculator is configured to calculate the costs for each of the resolution candidates for each of the first number of blocks, and
the resolution selector comprises count values each corresponding to each of the candidates,
is configured to count-up one of the count values corresponding to one of the resolution candidates which makes the cost minimum, and
is configured to select one of the resolution candidates making the corresponding count value maximum as the unified resolution.

19. The device of claim 18, wherein the resolution selector is configured to count-up one of the count values corresponding to the maximum one of the resolution candidates when the corresponding area is absent.

20. An image processing method, the method comprising:
detecting a corresponding area in a second input image which corresponds to a block in a first input image, the first input image comprising a first resolution, the second input image comprising a second resolution different from the first resolution;
generating a first converted image by scaling the block according to a third resolution which is one of a plurality of resolution candidates,
generating a second converted image by scaling the corresponding area according to the third resolution, and
generating a re-converted image by scaling the first converted image according to a ratio between the first resolution and the third resolution;
calculating a cost of scaling, according to the third resolution, the first input image and the second input image based on a first indication and a second indication, the first indication indicating a value obtained by quantifying an image quality difference based on differences between pixels corresponding to each other of the first converted image and the second converted image, the second indication indicating a value obtained by quantifying a degradation of a feeling of fineness based on differences between pixels corresponding to each other of the re-converted image and the block; and
determining one of the resolution candidates as the unified resolution based on the cost,
wherein at least the generating the first converted image and the generating the second converted image is performed by an image processing device comprising computer hardware.

* * * * *